(12) United States Patent
Kerr et al.

(10) Patent No.: US 7,753,349 B1
(45) Date of Patent: Jul. 13, 2010

(54) RADIAL CUSHIONING APPARATUS

(75) Inventors: Ronald W. Kerr, Geneva, IL (US);
Shellie Wonsowski, Warrneville, IL (US); Michael P. Molitor, North Aurora, IL (US); Terry J. Koehn, Geneva, IL (US); Richard J. Beranek, Maple Park, IL (US)

(73) Assignee: Miner Elastomer Products Corporation, Geneva, IL (US)

( * ) Notice: Subject to any disclaimer, the term of this patent is extended or adjusted under 35 U.S.C. 154(b) by 0 days.

(21) Appl. No.: 12/386,067

(22) Filed: Apr. 14, 2009

(51) Int. Cl.
*F16F 13/00* (2006.01)
(52) U.S. Cl. .................. 267/140.12; 267/153
(58) Field of Classification Search .......... 267/134, 267/136, 137, 140, 140.12, 141.1, 152, 153, 267/201
See application file for complete search history.

(56) References Cited

U.S. PATENT DOCUMENTS

| | | | |
|---|---|---|---|
| 1,101,293 A | 6/1914 | Kunkel | |
| 2,615,707 A | 10/1952 | Rowe et al. | |
| 2,819,060 A * | 1/1958 | Neidhart | 267/153 |
| 3,131,903 A | 5/1964 | Quick | |
| 3,145,012 A | 8/1964 | Kfoury | |
| 3,348,796 A | 10/1967 | Baratoff et al | |
| 3,368,824 A | 2/1968 | Julien | |
| 3,424,448 A * | 1/1969 | Chak Ma | 267/35 |
| 3,428,279 A | 2/1969 | Johnson | |
| 3,751,024 A * | 8/1973 | Pineau | 267/153 |
| 3,949,961 A * | 4/1976 | Pamer | 248/613 |
| 4,010,940 A * | 3/1977 | Freyler | 267/201 |
| 4,214,738 A * | 7/1980 | Casper | 267/141.1 |
| 4,650,167 A * | 3/1987 | Steiner et al. | 267/137 |
| 4,666,215 A | 5/1987 | Toms, Jr. | |
| 4,821,849 A | 4/1989 | Miller | |
| 5,080,331 A * | 1/1992 | de Fontenay | 267/140.12 |
| 6,499,570 B2 * | 12/2002 | Chu | 188/129 |
| 7,172,181 B2 | 2/2007 | Kerr et al. | |

\* cited by examiner

*Primary Examiner*—Christopher P Schwartz
(74) *Attorney, Agent, or Firm*—Law Office of John W. Harbst

(57) ABSTRACT

A radial cushioning apparatus including an inner member, an outer member, and an elastomer. The inner member accommodates a shaft passing endwise therethrough. The outer member is arranged in radially spaced relation from the inner member. The elastomer is secured to the inner and outer members and defines a plurality of collapsible spaces into which elastomer material can flex thereby cushioning radial deflection of the shaft.

24 Claims, 8 Drawing Sheets

RADIAL CUSHIONING APPARATUS

FIELD OF THE INVENTION DISCLOSURE

This invention disclosure generally relates to an apparatus for cushioning forces applied thereto and, more particularly, to a novel and improved apparatus for cushioning radial forces applied to a shaft.

BACKGROUND

Devices for cushioning shocks in two perpendicular directions by separate springs biased friction elements are known in the art. Such devices typically have one or more metal springs arranged in orthogonal relation relative to each other for absorbing forces applied to an object.

There are numerous applications and devices wherein a supported shaft is subjected to forces and impacts acting in a radial direction relative to an axis of the shaft. For example, agricultural sprayers typically include an elongated and cantilevered boom extending outwardly from opposed sides of a mobile frame of a machine. Typically, a shaft or rod operably connects a proximal end of the boom to a frame of the machine. Because such machines are driven across and over fields of uneven terrain, coupled with the cantilevered boom design, it can readily be understood how the pivotal connection of such a boom to the frame of the machine is subjected to extreme radial loadings, fatigue, and possible failure.

In this particular environment, relatively large springs and pneumatic drivers are arranged in operable combination with the machine frame to add stability to the booms when arranged in an extended outward position. It is desirable, therefore, for the boom mounting design to be simplified and to be more cost effective.

SUMMARY

According to one aspect, there is provided a radial cushioning apparatus including an inner member and an outer member. The inner member accommodates a shaft passing endwise therethrough. The outer member is arranged in radially spaced relation from the inner member. An elastomer is secured to the inner and outer members and defines a plurality of collapsible spaces into which elastomer material can flex thereby cushioning radial deflection of the shaft.

In one form, the inner member of the cushioning apparatus has a generally cylindrical sleeve-like configuration. Preferably, the outer member of the cushioning apparatus also has a generally cylindrical sleeve-like configuration.

In one embodiment, the elastomer of the cushioning apparatus includes a series of hollow elastomeric rings defining the plurality of collapsible spaces. Each ring is fastened to both the inner and outer members. Preferably, and for the cushioning apparatus to establish a generally constant spring rate, each hollow ring has predetermined inner and outer diameters. Notably, and as used herein and throughout, the term "ring" means and refers to a member of elastomeric material with a closed circumference extending thereabout. Although illustrated as having a generally circular cross-sectional configuration, it will be appreciated the elastomeric "rings" or members illustrated as an exemplary elastomer of this disclosure can likewise have alternative cross-sectional configurations, i.e., elliptical, oval, egg-shaped, hexagonal, octagonal or other various cross-sectional configurations without detracting or departing from the spirit and scope of this disclosure.

In one form, the outer diameters of the hollow elastomeric rings are arranged in adjacent relationship relative to each other whereby providing the cushioning apparatus with a predetermined spring rate and predetermined travel. In another form, the outer diameters of adjacent hollow rings are arranged in spaced relationship relative to each other whereby providing the cushioning apparatus with a predetermined spring rate and predetermined travel.

According to another aspect, there is provided a radial cushioning apparatus including an axial hub for accommodating a shaft passing endwise therethrough and an enlarged member arranged in radially spaced relation from the hub. In this embodiment, the axial hub defines an axis for the cushioning apparatus. Moreover, an elastomer is operably secured to the hub and to the enlarged member. As such, the elastomer between the hub and member, to one radial side of the axis of the cushioning apparatus, is compressed while the elastomer, to an opposite radial side of the axis of the cushioning apparatus, is tensioned in response to radial deflection of the shaft relative to the axis of the radial cushioning apparatus.

In one embodiment, the axial hub has a generally cylindrical sleeve-like configuration. Preferably, the enlarged member also has a generally cylindrical sleeve-like configuration.

The elastomer of the cushioning apparatus defines a series of collapsible openings between its inner and outer edges. Each collapsible opening defined by the elastomer preferably has a closed marginal edge with a predetermined and generally equal diameter. The collapsible openings in the elastomer allow elastomer material to deflect thereinto upon compression of the cushioning device in one radial direction.

In one form, the elastomer of the radial cushioning apparatus includes a series of hollow elastomeric rings defining a plurality of collapsible spaces into which elastomeric material can deflect during operation of the cushioning apparatus. Each ring is fastened to the axial hub and to the enlarged member. In one form, each hollow elastomeric ring has a predetermined inner diameter and a predetermined outer diameter.

In one form of the radial cushioning apparatus, the outer diameters of the hollow elastomeric rings are arranged in adjacent relationship relative to each other whereby providing the cushioning apparatus with a predetermined spring rate and predetermined travel. In another form of the radial cushioning apparatus, the outer diameters of adjacent hollow elastomeric rings are arranged in spaced relationship relative to each other whereby providing the cushioning apparatus with a predetermined spring rate and predetermined travel.

According to another aspect, there is provided a radial cushioning apparatus including an inner member and an outer member. The inner member accommodates a shaft defining an axis for the cushioning apparatus. The outer member is arranged in radially spaced relation from the inner member. According to this aspect, the cushioning apparatus further includes an elastomer for absorbing, dissipating and returning energy imparted thereto as a result of radial deflection of the shaft relative to the axis of the cushioning apparatus. The elastomer is secured to the inner and outer members and defines multiple openings extending generally parallel to the axis of the cushioning apparatus. In this embodiment, each opening has a closed marginal edge defining a collapsible space for elastomer material to flex into thereby accommodating radial deflection of the shaft during operation of the cushioning apparatus.

In one form, the elastomer of the cushioning apparatus includes a series of hollow elastomeric rings. Each ring defines a collapsible space into which elastomer material can deflect in response to radial deflection of the shaft during operation of the cushioning apparatus. Preferably, each ring is fastened to both the inner member and the outer member.

Preferably, each hollow elastomeric ring has a predetermined inner and a predetermined outer diameter. In one form of the cushioning apparatus, the outer diameters of the hollow elastomeric rings are arranged in adjacent relationship relative to each other so as to provide the cushioning apparatus with a predetermined spring rate and predetermined travel. In another form of the cushioning apparatus, adjacent elastomeric rings have their outer diameters in spaced relation relative to each other so as to provide the cushioning apparatus with a different predetermined spring rate and predetermined travel.

In another embodiment, the cushioning apparatus further includes an intermediary member disposed between and radially spaced from the inner member and the outer member. In this form of the cushioning apparatus, a first series of hollow elastomeric rings are fastened to the inner member and the intermediary member. A second series of hollow elastomeric rings are fastened to the intermediary member and the outer member. Preferably, the rings of the first series of hollow rings have an inner predetermined and an outer predetermined diameter. Moreover, the rings of the second series of hollow rings preferably have an inner predetermined and an outer predetermined diameter.

DETAILED DESCRIPTION OF THE DRAWINGS

DESCRIPTION OF THE DISCLOSURE

Figure 1:
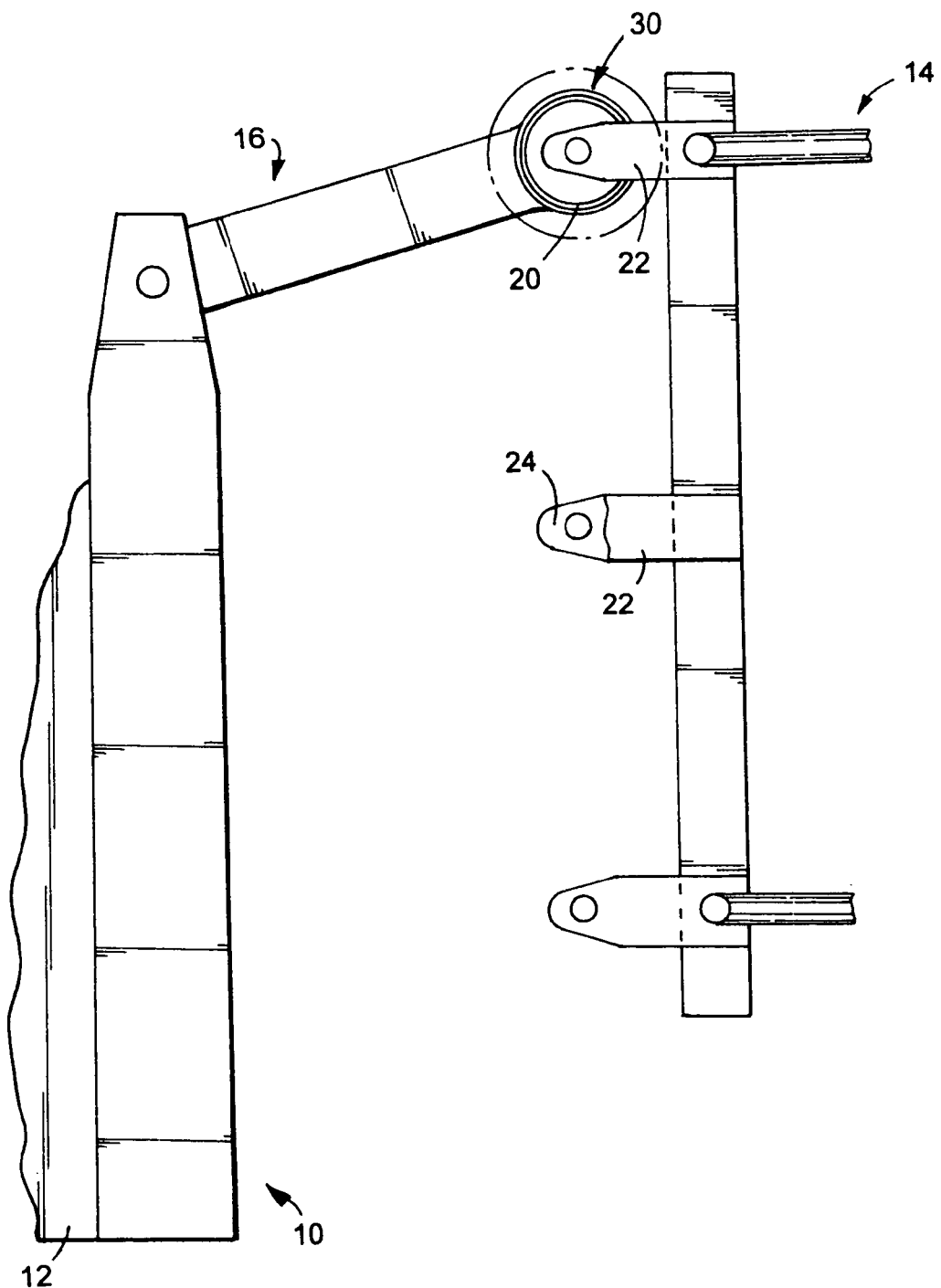
FIG. 1 is a schematic side elevational view of one form of a machine which utilizes a radial cushioning apparatus embodying principals of this invention disclosure.

While this invention disclosure is susceptible of embodiment in multiple forms, there is shown in the drawings and will hereinafter be described preferred embodiments, with the understanding the present disclosure is to be considered as setting forth exemplifications of the disclosure which are not intended to limit the disclosure to the specific embodiments illustrated and described.

Figure 2:
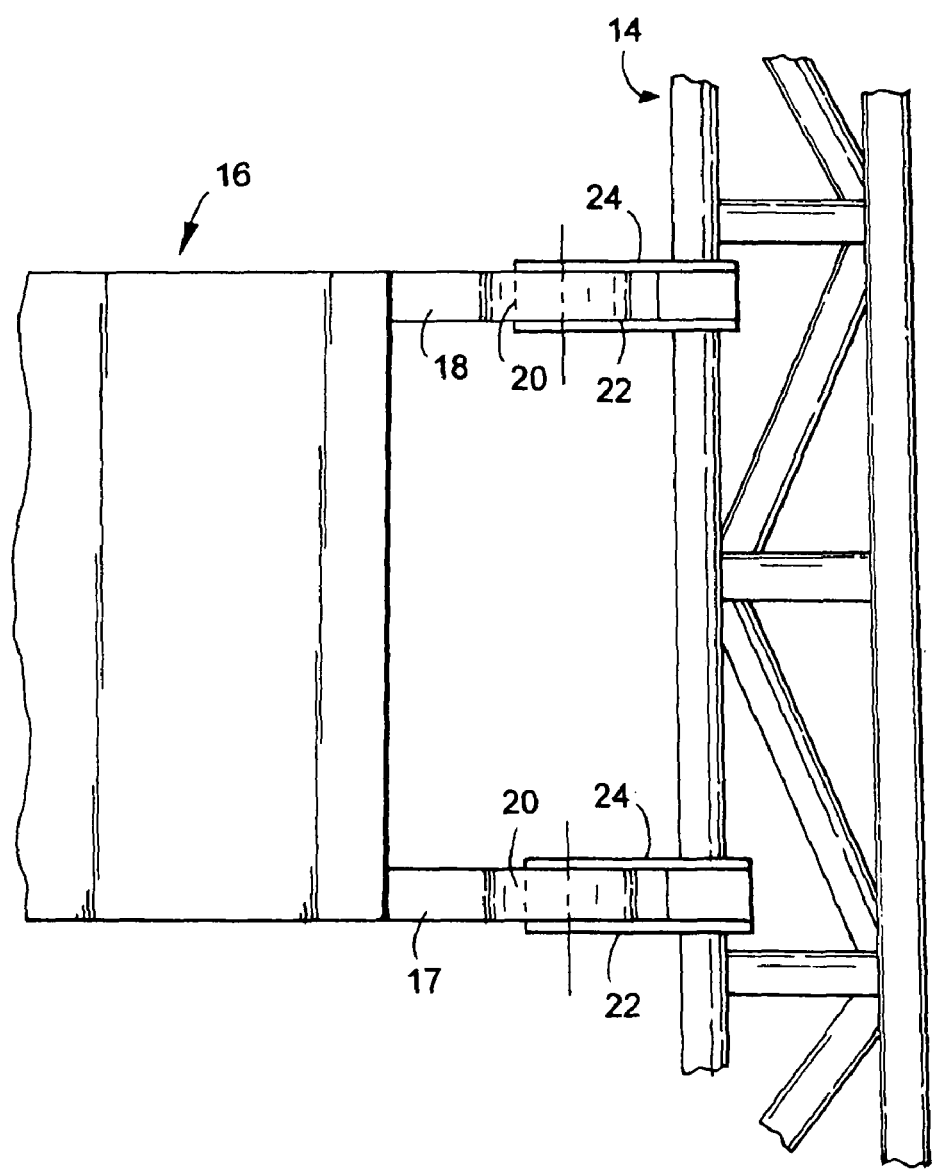
FIG. 2 is a fragmentary top plan view of the machine illustrated in FIG. 1.

Referring to the drawings, wherein like reference numerals indicate like parts throughout the several views, there is schematically shown in FIG. 1 an example of a machine, generally identified by reference numeral 10, with which the radial cushioning apparatus of this invention disclosure finds utility. In the illustrated example, machine 10 includes a frame 12 which is adapted to move over fields of uneven terrain. An elongated boom assembly 14 is operably connected to the frame 12 of machine 10 through a suitable connector 16 including a pair of arms 17 and 18 (FIG. 2). It will be appreciated, however, the radial cushioning apparatus of this invention disclosure is intended for use in a myriad of other applications and should not be limited to the particular machine shown for exemplary purposes.

The radial cushioning apparatus of the present disclosure is generally indicated by reference numeral 30 in FIG. 1. In the illustrated embodiment, a radial cushioning apparatus 30 is operably associated with each arm 17 and 18 of the connector 14. In the form shown in FIG. 1, a mounting 20 is arranged toward a distal end of each arm 17, 18. The mounting 20 on each arm 17, 18 operably carries a radial cushioning apparatus 30.

Figure 3:
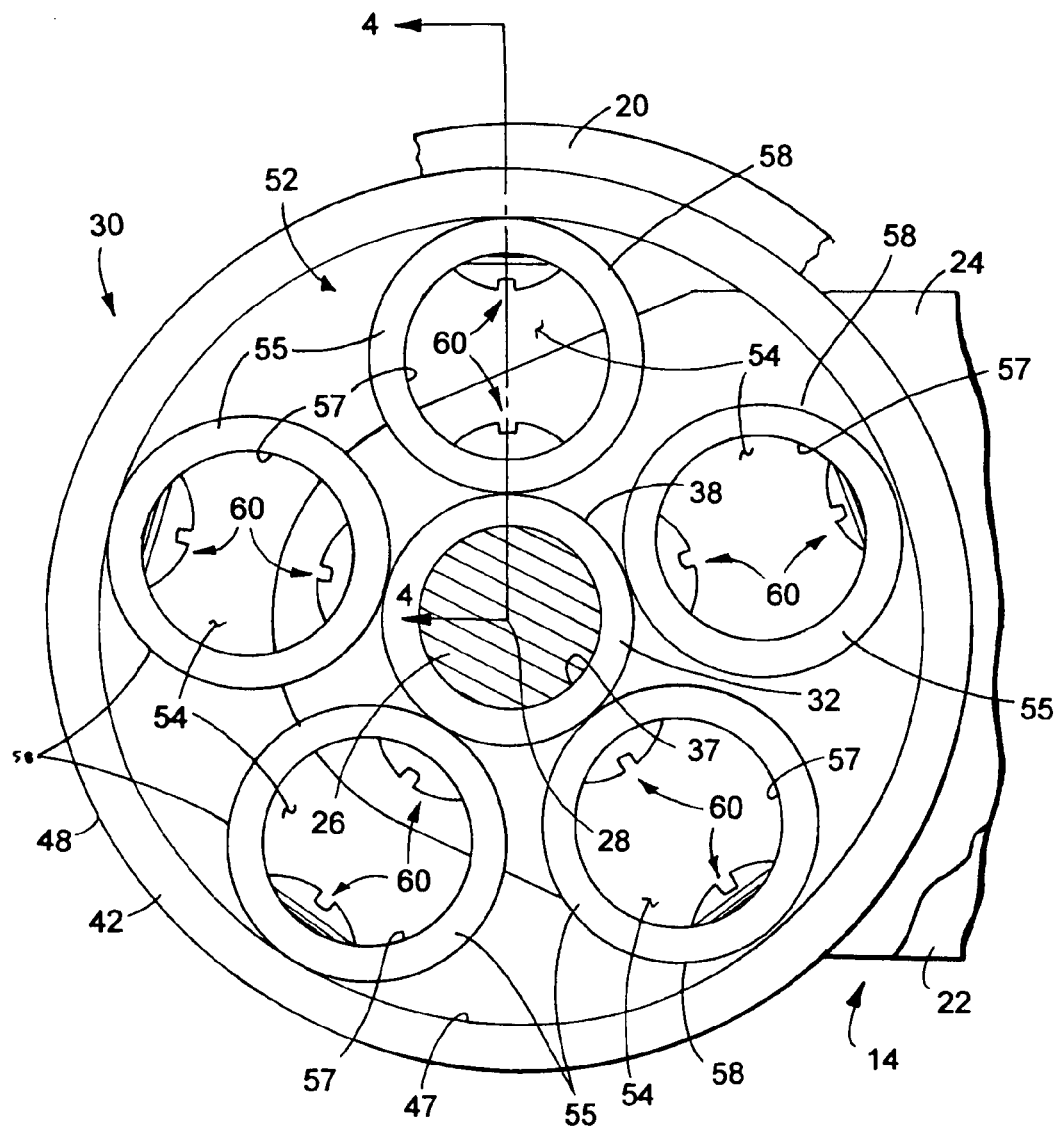
FIG. 3 is an enlarged view, with parts broken away to show details, of the radial cushioning apparatus encircled in phantom lines in FIG. 1.

As shown in FIG. 3, and after being arranged within each mounting 20, the cushioning apparatus 30 is arranged between and embraced on opposed sides by a pair of flanges 22 and 24 extending from and forming part of the boom assembly 14. A rod or shaft 26 defines an axis 28 for and operably mounts the radial cushioning apparatus 30 between the flanges 22 and 24. Conventional structure (not shown) prevents inadvertent endwise shifting movements of the rod or shaft 26 relative to the flanges 22, 24 during operation of the machine 10.

The purpose of the radial cushioning apparatus 30 is to absorb, dissipate and return energy imparted thereto in a direction extending perpendicular or normal to the axis 28 during operation of the machine 10. As shown in FIG. 3, the cushioning apparatus 30 includes an inner member or axial hub 32, an enlarged outer member 42 arranged in radially spaced relation from the inner member 32, and a resilient elastomer 52 secured to the inner member 32 and outer member 42. As shown in FIG. 3, the inner member 32 accommodates endwise passage of the shaft or rod 26 therethrough. In the illustrated embodiment, the inner member 32 is formed from metal, preferably steel, and has a generally cylindrical sleeve-like cross-sectional configuration between opposed ends 34 and 36 (FIG. 4) and has an inner diameter 37 and an outer diameter 38.

As shown in FIG. 3, the outer member 42 of apparatus 30 is formed from metal, preferably steel, and has a generally cylindrical sleeve-like cross-sectional configuration between opposed ends 44 and 46 (FIG. 4) and has an inner diameter 47 and outer diameter 48. In the illustrated embodiment, the distance between the ends 44 and 46 of the outer member 42 is generally equal to the distance between the ends 34 and 36 of the inner member 32. Moreover, the outer diameter 48 of the outer member 42 is sized to snuggly fit within the mounting 20 arranged at the distal end of the arms 17, 18 of connector 16 (FIG. 2) while allowing for rotation of the radial cushioning apparatus 30 relative to its respective mounting 20.

The resilient elastomer 52 for the cushioning apparatus 30 defines a series of collapsible open spaces 54 into which elastomer material can flex thereby cushioning radial deflection of the shaft or rod 26 during operation or movements of the machine 10 (FIG. 1). Each collapsible space 54 has a closed marginal edge and an axis which generally parallels the axis 28 of apparatus 30. With continued reference to the embodiment illustrated in FIG. 3, elastomer 52 is comprised of a series of substantially similar hollow and open-sided elastomeric rings 55; with each ring 55 defining a collapsible space 54. Although four rings 55 are illustrated for exemplary purposes in FIG. 3, it will be appreciated more or less elastomeric rings can used as part of the elastomer without detracting or departing from the spirit and scope of this disclosure. Each ring 55 has a generally cylindrical sleeve-like cross-sectional configuration between opposed ends 54 and 56 (FIG. 4) and includes a predetermined inner diameter 57 along with a radially spaced and predetermined outer diameter 58. In the embodiment illustrated in FIG. 3, the hollow rings 55 are positioned relative to each other such that the outer diameters 58 of any two radially adjacent rings 55 are radially spaced from each other.

Figure 4:
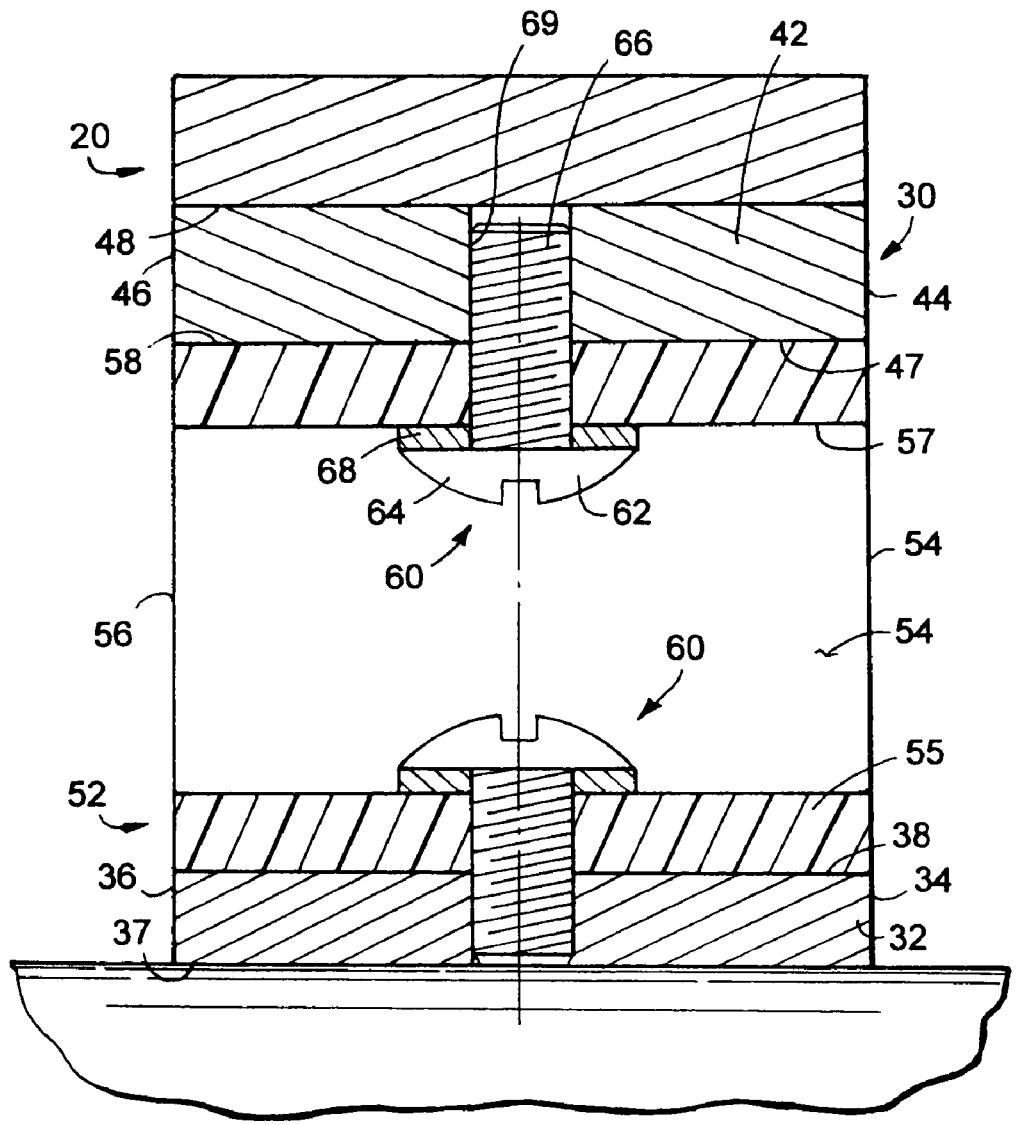
FIG. 4 is an enlarged sectional view taken along line 4-4 of FIG. 3.

As shown in FIG. 3, each hollow elastomeric ring 55 is fastened to both the inner member or axial hub 32 and to the radially enlarged outer member 42. As shown in FIG. 4, a fastener assembly 60 is used to fasten each hollow elastomeric ring 55 to both the inner member or axial hub 32 and to the radially enlarged outer member 42. The fastener assembly 60 can take any of a myriad of designs without detracting or departing from both the spirit and scope of this disclosure. To simplify the design and to reduce costs, each assembly 60 for individually fastening and securing each hollow ring 55 to the inner member 32 is preferably identical to the assembly 60 used to fasten and secure each hollow ring 55 to the outer member 42. Accordingly, only one fastener assembly will be discussed in detail.

In the embodiment shown by way of example in FIG. 4, each fastener assembly 60 includes a fastener 62 having an enlarged head portion 64 and a threaded shank portion 66. In an effort to prolong the integrity of each hollow elastomeric ring 55, and to broadly distribute forces applied to and exerted upon each ring 55 during operation of the apparatus 30, each fastener assembly 60 furthermore preferably includes an enlarged washer 68 disposed between the enlarged head portion 64 and the inner diameter 57 of each ring 55. As shown, the head portion 64 of each fastener 62 is configured to accommodate a conventional tool for rotating the fastener 62. The shank portion 66 of each fastener 62 is accommodated within one of a series of equally spaced threaded bores 69 defined by the inner and outer members 32 and 42, respectively.

By fastening each hollow ring 55 to both the inner member 32 and to the outer member 42, the elastomer 52 disposed on both radial sides of the shaft 26 will act in concert relative to each other to control radial displacement of the shaft 26 (and boom 14). That is, and in response to radial deflection of the shaft 26, the elastomer between the inner member or axial hub 32 and the outer member 42 on one radial side of the cushioning apparatus 30 will flex into the collapsible spaces 54 allowing the elastomer to be compressed while the spaces 54 defined by the elastomer 52 disposed between the inner member or axial hub 32 and the outer member 42 on a diametrically opposed radial side of the cushioning apparatus 30 will be tensioned and elongated in response to radial deflection of the rod or shaft 26 during operation of the machine 10 (FIG. 1). Of course, after the forces causing deflection of the rod or shaft 26 change or are modified, the resiliency of the elastomer 52 of the apparatus 30 on both sides of the shaft 26 will again act in concert to automatically cause and return the shaft or rod 26 (and boom 14) to a position wherein the forces acting on the shaft or rod 26 by the elastomer 52 are substantially equalized. Notably, the collapsible spaces 54 defined by the elastomer 52 of the cushioning apparatus permit significantly more travel and radial deflection of the rod or shaft 26 than would a solid core of elastomer having a substantially equivalent durometer hardness between the inner and outer members 32 and 42, respectively, of apparatus 30.

Figure 5:
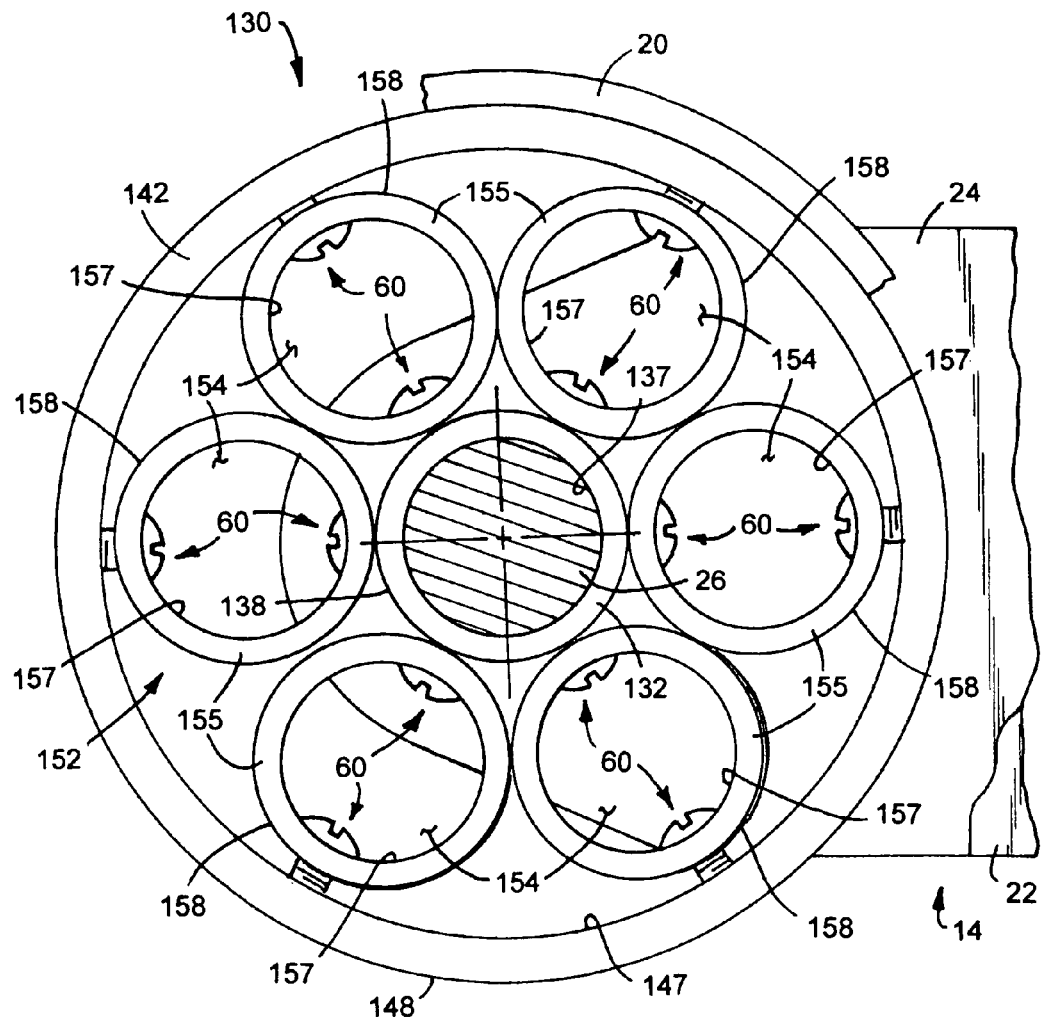
FIG. 5 is a view similar to FIG. 3 but showing an alternative form of radial cushioning apparatus embodying principals of this invention disclosure.

Another embodiment of a radial cushioning apparatus embodying principals of this invention disclosure is illustrated in FIG. 5. This alternative form of cushioning apparatus is designated generally by reference numeral 130. The elements of this alternative form of cushioning apparatus that are identical or functionally analogous to those components or elements of apparatus 30 discussed above are designated generally by reference numerals identical to those used above with the exception this embodiment of cushioning apparatus uses reference numerals in the 100 series.

The cushioning apparatus 130 includes an inner member or axial hub 132, an enlarged outer member 142 arranged in radially spaced relation from the inner member 132, and a resilient elastomer 152 secured to the inner member 132 and outer member 142. As shown in FIG. 5, the inner member or axial hub 132 accommodates endwise passage of the shaft or rod 26 therethrough. In the illustrated embodiment, the inner member 132 is formed from metal preferably steel, and has a generally cylindrical sleeve-like cross-sectional configuration between opposed ends and includes an inner diameter 137 and an outer diameter 138.

In the embodiment shown in FIG. 5, the outer member 142 of apparatus 130 is formed from metal, preferably steel, and has a generally cylindrical sleeve-like cross-sectional configuration and includes an inner diameter 147 and an outer diameter 148. Preferably, the outer diameter 148 of the outer member 142 is sized to snuggly fit within the mounting 20 arranged at the distal end of each arm 17, 18 of the connector 16 (FIG. 2) while allowing for rotation of the radial cushioning apparatus 130 relative to its respective mounting 20.

The resilient elastomer 152 for the cushioning apparatus 130 defines a series of collapsible open spaces 154 into which elastomer material can flex thereby cushioning radial deflection of the shaft or rod 26 during operation or movements of the machine 10 (FIG. 1). Each collapsible space 154 has a closed marginal edge and an axis which generally parallels the axis of apparatus 130. With continued reference to the embodiment illustrated in FIG. 5, elastomer 152 is comprised of a series of substantially similar hollow and open-sided elastomeric rings 155 defining the series of collapsible spaces 154. Although six elastomeric rings 155 are illustrated for exemplary purposes in FIG. 5, it will be appreciated more or fewer elastomeric rings can used as part of the elastomer without detracting or departing from the spirit and scope of this disclosure. Each ring 155 has a generally cylindrical sleeve-like cross-sectional configuration and includes a predetermined inner diameter 157 along with a radially spaced and predetermined outer diameter 158.

To enhance its versatility, one of the many advantages afforded by the cushioning apparatus of the present disclosure relates to the ability to change the spring rate provided by the apparatus while maintaining the operative outer diameter of the cushioning apparatus substantially equal. With regard to the embodiment illustrated in FIG. 5, it should be noted the elastomeric rings 155 comprising elastomer 152 are positioned relative to each other such that the outer diameters 158 of any two adjacent rings 155 are arranged in radially adjacent relationship relative to each other.

Each hollow elastomeric ring 155 is fastened to both the inner member or axial hub 132 and to the radially enlarged outer member 142 with a fastener assembly 60 in a manner substantially similar to that discussed above. By fastening each hollow ring 155 to both the inner member 132 and to the outer member 142, the elastomeric members 155 disposed on both radial sides of the shaft 26 will act in concert relative to each other to control radial displacement of the shaft 26 (and boom 14). That is, the elastomeric members 155 between the inner member or axial hub 132 and the outer member 142 on one radial side of the cushioning apparatus 130 will flex into the collapsible spaces 154 allowing the elastomer to be compressed while the spaces 154 defined by the elastomeric members 155 disposed between the inner member or axial hub 132 and the outer member 142 on a diametrically opposed radial side of the cushioning apparatus 130 will be tensioned and elongated in response to radial deflection of the rod or shaft 26 during operation of the machine 10 (FIG. 1). Of course, after those forces causing deflection of the rod or shaft 26 change or are modified, the resiliency of the elastomeric members 155 of the apparatus 130 on each side of the shaft 26 will automatically cause and return the shaft or rod 26 (and boom 14) to return to a position wherein the forces acting on the shaft or rod 26 by the elastomer 152 are substantially equalized.

Notably, however, in the embodiment illustrated in FIG. 5, the adjacent relationship of the outer diameters 158 of the adjacent rings 155 limits the deflection of the rings 155 more than is allowed when the elastomeric rings are radially spaced or separated from each other (FIG. 3). Although the apparatus illustrated in FIG. 5 more so limits the radial travel or displacement of the shaft 26 than does the apparatus illustrated in FIG. 3, the collapsible spaces 154 defined by the elastomer 152 of the cushioning apparatus illustrated in FIG. 5 remains to provide more travel and radial deflection of the rod or shaft 26 than would a solid core of elastomer of equivalent durometer hardness between the inner and outer members 132 and 142, respectively, of apparatus 130.

Figure 6:
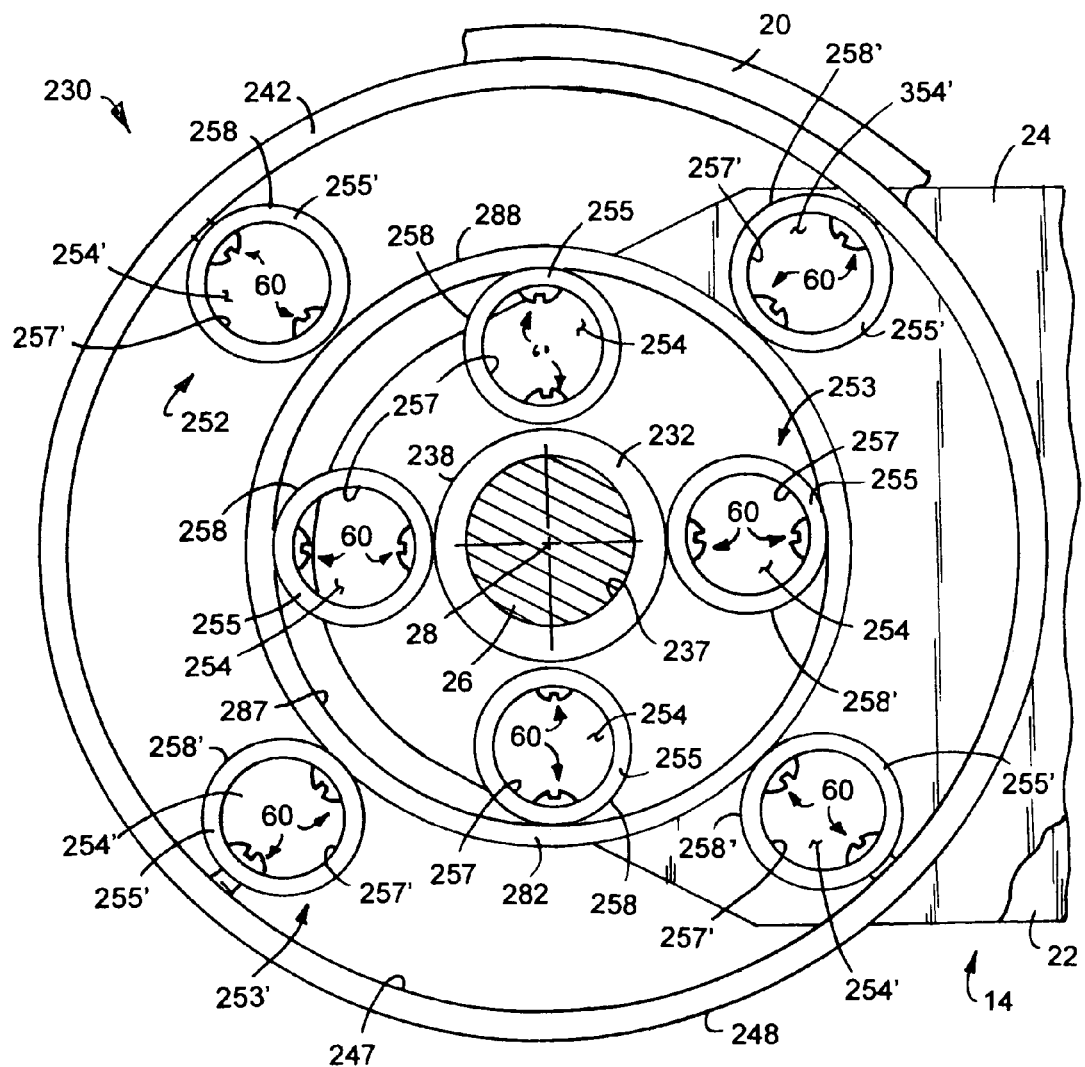
FIG. 6 is another view similar to FIG. 3 but showing another alternative form of radial cushioning apparatus embodying principals of this invention disclosure.

Another embodiment of a radial cushioning apparatus embodying principals of this invention disclosure is illustrated in FIG. 6. This alternative form of cushioning apparatus is designated generally by reference numeral 230. The elements of this alternative form of cushioning apparatus that are identical or functionally analogous to those components or elements of apparatus 30 discussed above are designated generally by reference numerals identical to those used above with the exception this embodiment of cushioning apparatus uses reference numerals in the 200 series.

The cushioning apparatus 230 includes an inner member or axial hub 232, an enlarged outer member 242 arranged in radially spaced relation from the inner member 232, and a resilient elastomer 252. In the embodiment shown in FIG. 6, apparatus 230 further includes an intermediary member 282 disposed between and radially spaced from the inner member 232 and outer member 242. As shown, the inner member or axial hub 232 accommodates endwise passage of the shaft or rod 26 therethrough. In the illustrated embodiment, the inner member 232 is formed from metal preferably steel, and has a generally cylindrical sleeve-like cross-sectional configuration between opposed ends and includes an inner diameter 237 and an outer diameter 238.

In the embodiment shown in FIG. 6, the outer member 242 of the cushioning apparatus 230 is formed from metal, preferably steel, and has a generally cylindrical sleeve-like cross-sectional configuration and includes an inner diameter 247 and an outer diameter 248. The outer diameter 248 of the outer member 242 is sized to snuggly fit within the mounting 20 arranged at the distal end of each arm 17 and 18 of the connector 16 (FIG. 2) while allowing for rotation of the radial cushioning apparatus 230 relative to its respective mounting 20.

The intermediary member 282 of the cushioning apparatus 230 illustrated in FIG. 6 is formed from metal, preferably steel, and has a generally cylindrical sleeve-like cross-sectional configuration. Member 282 includes an inner diameter 287 and an outer diameter 288.

The resilient elastomer 252 for the radial cushioning apparatus 230 shown in FIG. 6 is comprised of a first series 253 of hollow elastomeric rings 255 defining a first series of collapsible open spaces 254 into which elastomer material can flex thereby cushioning radial deflection of the shaft or rod 26 during operation or movements of the machine 10 (FIG. 1). Although the first series of rings 253 illustrated for exemplary purposes in FIG. 6 is shown as including four elastomeric rings 255, it will be appreciated more or fewer elastomeric rings can used as part of the series 253 without detracting or departing from the spirit and scope of this disclosure. Each collapsible space 254 has a closed marginal edge and an axis which generally parallels the axis of apparatus 230. Each hollow elastomeric ring 255 has a generally cylindrical sleeve-like cross-sectional configuration and includes a predetermined inner diameter 257 along with a radially spaced and predetermined outer diameter 258. In the embodiment shown in FIG. 6, the outer diameters 258 of any two adjacent elastomeric rings 255 comprising elastomer 252 are arranged in radially spaced relationship from each other. Without detracting or departing from the spirit and scope of this invention disclosure, with only slight variations to their design, and to enhance the versatility of the apparatus, the outer diameters 258 of adjacent hollow rings 258 can be arranged in abutting relationship relative to each other whereby changing the spring rate of the cushioning apparatus while concurrently changing the flexure capability of shaft or rod 26.

The resilient elastomer 252 for the radial cushioning apparatus 230 shown in FIG. 6 further includes a second series 253' of hollow elastomeric rings 255' defining a second series of collapsible open spaces 254' into which elastomer material can flex thereby cushioning radial deflection of the shaft or rod 26 during operation or movements of the machine 10 (FIG. 1). Although the second series of rings 253' illustrated for exemplary purposes in FIG. 6 is shown as including four elastomeric rings 255', it will be appreciated more or fewer elastomeric rings can used as part of the series 253' without detracting or departing from the spirit and scope of this disclosure. Each collapsible space 254' has a closed marginal edge and an axis which generally parallels the axis of apparatus 230. Each hollow elastomeric ring 255' has a generally cylindrical sleeve-like cross-sectional configuration and includes a predetermined inner diameter 257' along with a radially spaced and predetermined outer diameter 258'. In the embodiment illustrated in FIG. 6, the outer diameters 258' of any two adjacent elastomeric rings 255' comprising elastomer 252 are arranged in radially spaced relationship relative to each other. Without detracting or departing from the spirit and scope of the invention disclosure, with only slight variations to their design, and to enhance the versatility of the cushioning apparatus, the outer diameters 258' of adjacent hollow rings 258' can be arranged in abutting relationship relative to each other whereby changing the spring rate of the cushioning apparatus while concurrently changing the flexure capability of shaft or rod 26.

In the embodiment shown by way of example in FIG. 6, each hollow elastomeric ring 255 in the first series of hollow rings 253 is fastened to both the outer diameter of the inner member or axial hub 232 and the inner diameter 287 of the intermediary member 282 with a fastener assembly 60 and in a manner substantially similar to that discussed above. Similarly, each hollow elastomeric ring 255' in the second series of hollow rings 253' is fastened to both the outer diameter 288 of the intermediary member 282 and the inner diameter 247 of the outer member 242 with a fastener assembly 60 and in a manner substantially similar to that discussed above. As discussed above, by fastening the hollow rings 255 and 255' to both the inner member 232, the intermediary member 282 and to the outer member 242, the elastomer 252, including rings 255 and 255', on both radial sides of the shaft 26 will operate in concert to control radial displacement of the shaft 26 (and boom 14). The elastomer of the rings 255, 255' disposed between the inner member 232 and the outer member 242 on one radial side of the cushioning apparatus 230 will flex into the collapsible spaces 254 and 254' defined by the elastomer 252 whereby allowing the elastomer to be compressed while the spaces 254 and 254' defined by the elastomer 252 disposed between the inner member or axial hub 232 and the outer member 242 on a diametrically opposed radial side of the cushioning apparatus 230 will be tensioned and elongated in response to radial deflection of the rod or shaft 26 during operation of the machine 10 (FIG. 1). Of course, after the forces causing deflection of the rod or shaft 26 change or are modified, the resiliency of the elastomer 252 of the apparatus 230 on both radial sides of the shaft 26 will automatically cause the shaft or rod 26 (and boom 14) to return to a position wherein the forces applied by the elastomer 252 of the cushioning apparatus 230 to the shaft or rod 26 are substantially equalized.

Figure 7:
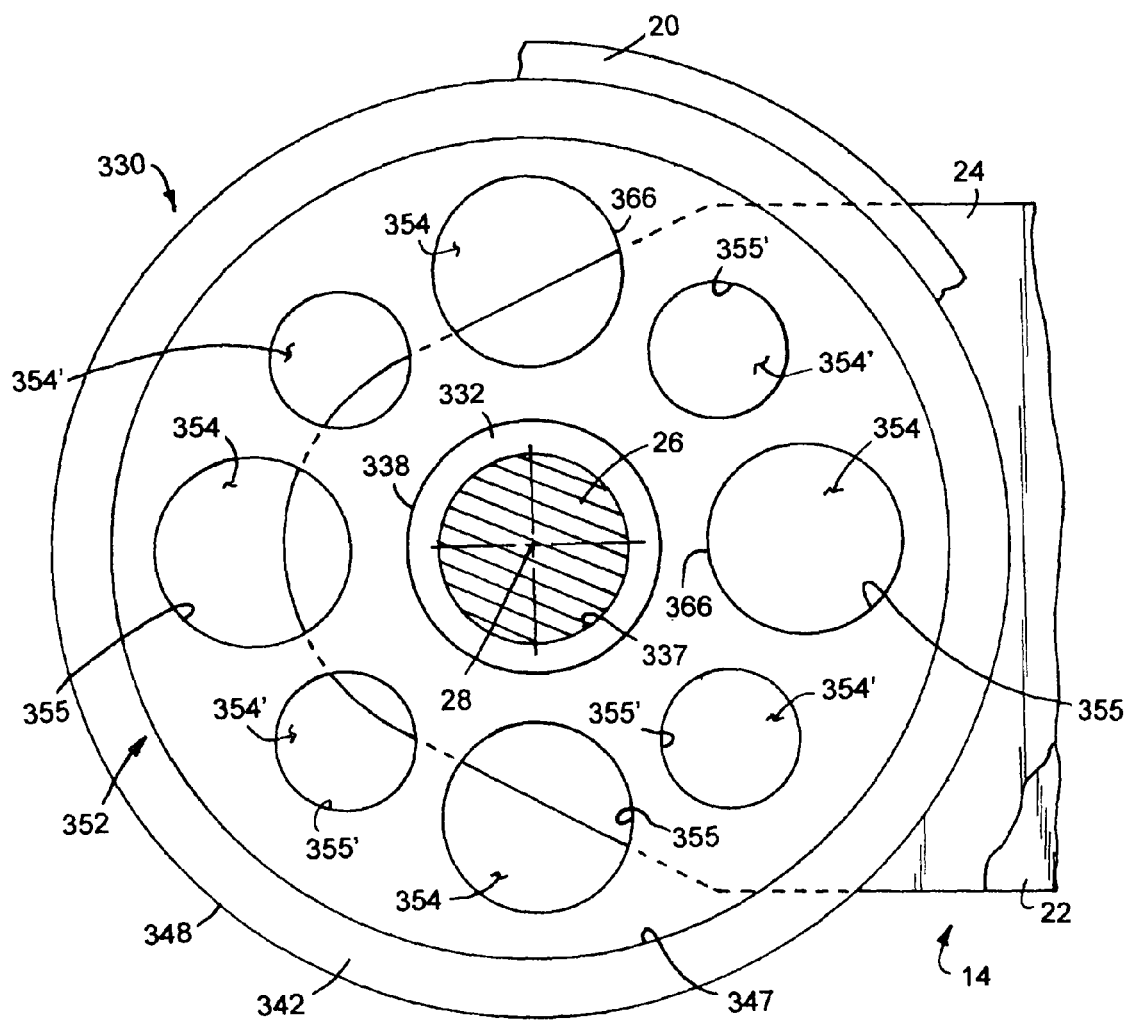
FIG. 7 is yet another view similar to FIG. 3 but showing still another alternative form of radial cushioning apparatus embodying principals of this invention disclosure.
Figure 8:
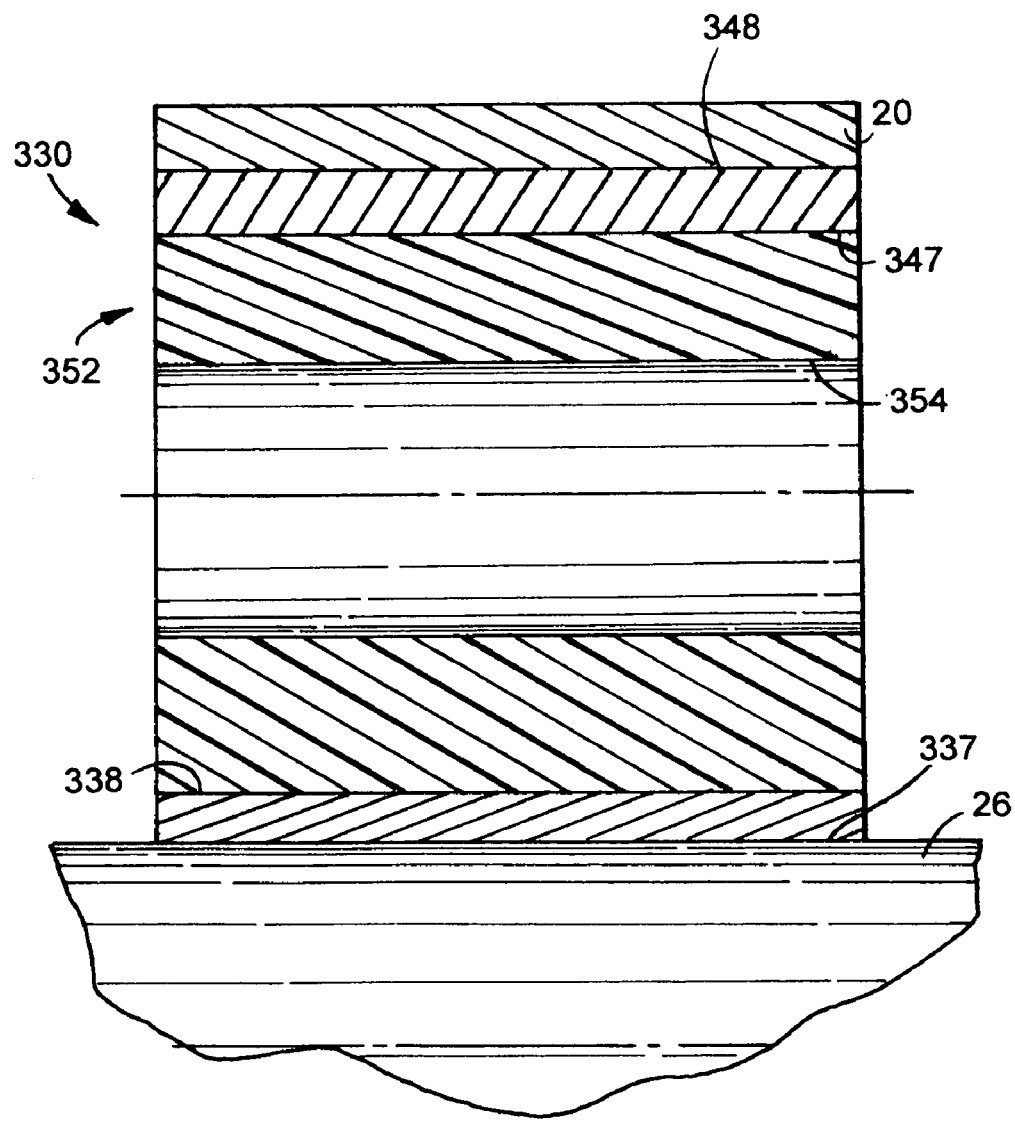
FIG. 8 is an enlarged sectional view taken along line 8-8 of FIG. 7.

Still another embodiment of a radial cushioning apparatus embodying principals of this invention disclosure is illustrated in FIGS. 7 and 8. This alternative form of cushioning apparatus is designated generally by reference numeral 330. The elements of this alternative form of cushioning apparatus that are identical or functionally analogous to those components or elements of apparatus 30 discussed above are designated generally by reference numerals identical to those used above with the exception this embodiment of cushioning apparatus uses reference numerals in the 300 series.

The cushioning apparatus 330 includes an inner member or axial hub 332, an enlarged outer member 342 arranged in radially spaced relation from the inner member 332, and a resilient elastomer 352 secured to the inner member 332 and outer member 342. As shown in FIG. 7, the inner member or axial hub 332 accommodates endwise passage of the shaft or rod 26 therethrough. In the illustrated embodiment, the inner member 332 is formed from metal, preferably steel, and has a generally cylindrical sleeve-like cross-sectional configuration between opposed ends and includes an inner diameter 337 and an outer diameter 338.

In the embodiment shown in FIG. 7, the outer member 342 of apparatus 330 is formed from metal, preferably steel, and has a generally cylindrical sleeve-like cross-sectional configuration and includes an inner diameter 347 and an outer diameter 348. Preferably, the outer diameter 348 of the outer member 342 is sized to snuggly fit within the mounting 20 arranged at the distal end of each arm 17, 18 of the connector 16 (FIG. 2) while allowing for rotation of the radial cushioning apparatus 330 relative to its respective mounting 20.

The resilient elastomer 352 for the radial cushioning apparatus 330 defines a series of collapsible open spaces 354 and 354' into which elastomer material can flex thereby cushioning radial deflection of the shaft or rod 26 during operation or movements of the machine 10 (FIG. 1). In the embodiment illustrated in FIG. 7, the open spaces 354 and 354' are defined by a series of bores 355 and 355' extending through and opening to opposed sides of the elastomer 352. As shown, the bores or open spaced 355, 355 preferably extend generally parallel to the axis of apparatus 330. Although four open spaces 354 and four open spaces 354' are illustrated for exemplary purposes in FIG. 7, it will be appreciated more or fewer open spaces can be provided without detracting or departing from the spirit and scope of this disclosure. In this exemplary embodiment, the bores are equally spaced relative to each other and each bore 355 and 355' has a closed marginal edge 366 defining the collapsible space 354 and 354' into which elastomer material can flex upon radial deflection of the shaft 26. In the embodiment illustrated in FIG. 7, the bores 355 are a first predetermined diameter while bore 355' are of a second predetermined diameter; with the first and second predetermined diameters being different from each other.

In the embodiment shown in FIGS. 7 and 8, the elastomer 352 is secured as with adhesive or the like about the outer diameter 338 of the inner member 332 and about the inner diameter 347 of the radially enlarged outer member 342. As discussed above, by securing the elastomer 352 to both the inner member 332 and to the outer member 342, the elastomer 352 disposed between the inner member 332 and the outer member 342 on one radial side of the cushioning apparatus 330 will flex into the collapsible spaces 354 and 354' allowing the elastomer to be compressed while the spaces 354 and 354' defined by the elastomer 352 disposed between the inner member or axial hub 332 and the outer member 342 on a diametrically opposed radial side of the cushioning apparatus 330 will be tensioned and elongated in response to radial deflection of the rod or shaft 26 during operation of the machine 10 (FIG. 1). After those forces causing deflection of the rod or shaft 26 change or are modified, the resiliency of the elastomer 352 of the apparatus 330 on both sides of the shaft 26 will automatically cause and return the shaft 26 (and boom 14) to a position wherein the forces acting on the shaft or rod 26 by the elastomer 352 are substantially equalized.

The elastomer used in combination with the cushioning apparatus can constitute any of a variety of blends of materials from natural rubber to composite blends of synthetic materials. Preferably, the elastomer for the cushioning apparatus is initially created as a preform which can be formed of almost any thermoplastic material. An elastomer having tensile characteristics such that the ratio of plastic strain to elastic strain is greater than 1.5 to 1 has proven particularly beneficial. The preferred elastomer is a copolyester polymer elastomer manufactured and sold by E. I. duPont de Nemoirs under the trademark Hytrel®. Notably, however, elastomer materials others than Hytrel® would equally suffice without detracting or departing from the spirit and scope of this disclosure. Preferably, the elastomeric material has a molecular structure and a Shore D durometer hardness ranging between about 35 and 72. The most preferred embodiment form for the elastomer has a Shore D durometer measuring between about 45 and about 50. Notably, the elastomer material forming the elastomer is free of spring-like characteristics and is reasonably inert. Significantly, such elastomer is quite durable and has an excellent flex life. Moreover, such elastomer is not subject to tearing or to crack propagation even in relatively thin cross-sections. For a more complete description of this elastomer, attention is directed to U.S. Pat. No. 4,198,037 to D. G. Anderson; applicable portions of which are incorporated herein by reference.

Normally, the selected elastomer material is purchased in pellet form, and is injected or extruded into a mold to form the preform. Various plastic molding techniques such as melt casting, injection molding, rotational molding, etc, can be used to fabricate the preform.

After forming the preform, the elastomer used in combination with the cushioning apparatus, is preferably worked in a manner orienting the molecular structure of the elastomer material. The phrase or term "working" or "worked" means and refers to controllably manipulating the preform after it is formed. More specifically, and in accordance with one spring making process, after the preform is fabricated, the preform is controllably manipulated as by squeezing or compressing the preform within a press and in a predetermined radial direction, by more than 30% to 35% of the initial predetermined outer diameter defined by the outer diameter of the preform. The radial compression of the preform causes the molecular structure of the elastomer to become orientated in at least one direction and transmutes the preform into a spring having a predetermined spring rate.

After the preform is radially compressed, the preform takes a compression spring shape or "set". As worked, the preform is free of compression set problems and, upon subsequent compressions, that is, when the preform is again radially compressed, the preform will provide a repeatable and substantially constant spring rate and will constantly return or spring back to its formed shape. In part, the "spring back" characteristics, as well as the spring rate characteristics of the preform, result from the orientation of the molecules of Hytrel®.

According to this method of making the elastomer for the cushioning apparatus, and after the preform is initially formed, the preform can be radially pulled or stretched in opposed directions by a distance greater than 30% to 35% of the predetermined size or outer diameter of the preform. Radially stretching or pulling the preform causes the molecular structure of the elastomer to become oriented in at least one direction.

After the preform is radially stretched, the preform returns to a compression spring shape or "set". As worked, the preform is free of compression set problems and, upon subsequent compressions, that is, when the preform is again radially compressed, the preform will provide a repeatable and substantially constant spring rate and will consistently return or spring back to a predetermined shape. In part, the "spring back" characteristics, as well as the spring rate characteristics of preform are the result of the orientation of the molecules of elastomer resulting from "working" of the preform.

It should be appreciated, the process of working the preform can include the working of the preform either individually or in combination or in reverse order relative to each other without detracting or departing from the invention. That is, after preform has been compressed, the preform to be used as a spring may not have the desired predetermined operative distance or outer diameter, and thus, the "worked" size of the preform may require correction. Accordingly, the preform can thereafter be stretched or pulled in opposed directions to accomplish the desired operative outside diameter. Similarly, and after the preform has been stretched, the resultant shape may not have the desired predetermined outside diameter for the desired spring and, thus, the "worked" size of the preform may require correction. Accordingly, the worked preform can be thereafter radially compressed to accomplish the desired outside diameter.

Advantageously, the spring rate or operating characteristics of the cushioning apparatus according to the present disclosure can be readily changed using multiple variables. For example, the spring rate or operating characteristics of the cushioning apparatus according to the present disclosure can be readily changed simply by changing the size of the openings defining the collapsible spaces into which elastomer material deflects resulting from radial shifting movements of the shaft or rod 26 during operation of the machine 10. The spring rate or operating characteristics of the cushioning apparatus according to the present disclosure can be readily changed by selecting one preferred form of elastomer from another. Alternatively, the durometer hardness of the elastomer can be modified whereby changing the spring rate or operating characteristics of the cushioning apparatus. Furthermore, the radial disposition of the collapsible spaces defined by the elastomer and their angular relation relative to the forces directed against the cushioning apparatus readily allow changing the spring rate or operating characteristics of the cushioning apparatus. As mentioned above, designing the elastomer such that the outer diameter of the hollow rings or members are or are not arranged in interengaging relationship relative to each other will limit the deflection of the springs and thereby control the spring rate or operating characteristics of the cushioning apparatus. Of course, the number of collapsible openings defined by the elastomer of the cushioning apparatus will furthermore limit and control the radial deflection of the rod or shaft 26 and control the spring rate afforded by the cushioning apparatus during operation of the machine 10.

From the foregoing, it will be observed that numerous modifications and variations can be made and effected without departing or detracting from the true spirit and novel concept of this invention disclosure. Moreover, it will be appreciated, the present disclosure is intended to set forth exemplifications which are not intended to limit the disclosure to the specific embodiments illustrated. Rather, this disclosure is intended to cover by the appended claims all such modifications and variations as fall within the spirit and scope of the claims.

What is claimed is:

1. A radial cushioning apparatus, comprising:
    an inner member for accommodating a shaft passing endwise therethrough, with said shaft defining an axis;
    an outer member arranged in radially spaced relation from said inner member; and
    a thermoplastic elastomer arranged about said inner member and between said inner and outer members, with said thermoplastic elastomer defining a plurality of open-sided collapsible spaces into which elastomer material can flex thereby cushioning radial deflection of said shaft, and with said thermoplastic elastomer being secured to said inner member and secured to said outer member such that the elastomer on opposite sides of the axis of said shaft serves to conjointly cushion radial displacement of said shaft.

2. The radial cushioning apparatus according to claim 1, wherein said inner member is formed from metal and has a generally cylindrical sleeve-like configuration.

3. The radial cushioning apparatus according to claim 1, wherein said outer member is formed from metal and has a generally cylindrical sleeve-like configuration.

4. The radial cushioning apparatus according to claim 1, wherein said thermoplastic elastomer includes a series of hollow elastomeric members defining said plurality of collapsible spaces, with each member being fastened to said inner member and said outer member.

5. The radial cushioning apparatus according to claim 4, wherein each hollow elastomer member has a predetermined inner and a predetermined outer diameter.

6. The radial cushioning apparatus according to claim 5, wherein the outer diameters of said hollow elastomer members are arranged in adjacent contacting relationship relative to each other whereby providing said cushioning apparatus with a predetermined spring rate and predetermined travel.

7. The radial cushioning apparatus according to claim 5, wherein the outer diameters of adjacent hollow members are arranged in radially spaced relationship relative to each other whereby providing said cushioning apparatus with a predetermined spring rate and predetermined travel.

8. A radial cushioning apparatus, comprising:
    a axial hub for accommodating a shaft passing endwise therethrough, with said shaft defining an axis for said cushioning apparatus;
    an enlarged member arranged in radially spaced relation from said hub; and a series of hollow thermoplastic elastomer members disposed between said axial hub and said enlarged member; and with each hollow thermoplastic elastomer member having a first fastener for securing a respective thermoplastic member to said axial hub and a second fastener arranged in diametrically opposed relation from said first fastener for securing a respective thermoplastic elastomer member to said enlarged member such that a thermoplastic elastomer member between said hub and said enlarged member and disposed to one side of said central axis is compressed while the thermoplastic elastomer member between said hub and said enlarged member and disposed to an opposite side of said central axis is tensioned in response to radial deflection of said shaft relative to said axis.

9. The radial cushioning apparatus according to claim 8, wherein said axial hub is formed from metal and has a generally cylindrical sleeve-like configuration.

10. The radial cushioning apparatus according to claim 8, wherein said enlarged member is formed from metal and has a generally cylindrical sleeve-like configuration.

11. The radial cushioning apparatus according to claim 8, with said series of thermoplastic elastomer members defining a series of openings between said hub and said enlarged member, with each opening having a closed marginal edge and a predetermined and generally equal diameter, with each opening allowing elastomer material to deflect thereinto upon compression of said cushioning device in one radial direction.

12. The radial cushioning apparatus according to claim 8, wherein said elastomer members includes a series of hollow elastomeric rings defining a plurality of collapsible spaces into which elastomeric material can deflect, with each ring being fastened to said hub and said enlarged member.

13. The radial cushioning apparatus according to claim 12, wherein each hollow elastomeric ring has a predetermined inner diameter and a predetermined outer diameter.

14. The radial cushioning apparatus according to claim 13, wherein the outer diameters of said hollow elastomeric rings are arranged in radially adjacent relationship relative to each other whereby providing said cushioning apparatus with a predetermined spring rate and predetermined travel.

15. The radial cushioning apparatus according to claim 13, wherein the outer diameters of adjacent hollow elastomeric rings are arranged in radially spaced relationship relative to each other whereby providing said cushioning apparatus with a predetermined spring rate and predetermined travel.

16. A radial cushioning apparatus, comprising:
an inner member for accommodating a shaft defining an axis for said cushioning apparatus;
an outer member arranged in radially spaced relation from said inner member; and
a series of hollow thermoplastic elastomer members disposed between said inner and outer members for absorbing, dissipating and returning energy imparted thereto as a result of radial deflection of said shaft relative to said axis; and
with each hollow thermoplastic elastomer member being secured with a first fastener to said inner member and with a second fastener to said outer member, and with said series of hollow thermoplastic elastomer members defining multiple openings extending generally parallel to said axis, with each opening having a closed marginal edge defining a collapsible space for elastomer material to flex into thereby accommodating radial deflection of said shaft.

17. The radial cushioning apparatus according to claim 16, wherein said series of thermoplastic elastomer members includes a series of hollow elastomeric rings defining said collapsible spaces, with each ring being fastened to said inner member and said outer member.

18. The radial cushioning apparatus according to claim 16, wherein each hollow elastomeric ring has a predetermined inner and a predetermined outer diameter.

19. The radial cushioning apparatus according to claim 18, wherein the outer diameters of said hollow elastomeric rings are arranged in radially adjacent relationship relative to each other whereby providing said cushioning apparatus with a predetermined spring rate and predetermined travel.

20. The radial cushioning apparatus according to claim 18, wherein the outer diameters of adjacent hollow elastomeric rings are arranged in radially spaced relationship relative to each other whereby providing said cushioning apparatus with a predetermined spring rate and predetermined travel.

21. The radial cushioning apparatus according to claim 18, further including an annular intermediary member disposed between and radially spaced from said inner member and said outer member.

22. The radial cushioning apparatus according to claim 21, wherein a first series of hollow elastomeric rings are fastened to said inner member and said intermediary member, with a second series of hollow elastomeric rings being fastened to said intermediary member and said outer member.

23. The radial cushioning apparatus according to claim 22, wherein the rings of said first series of hollow rings have an inner predetermined and an outer predetermined diameter.

24. The radial cushioning apparatus according to claim 22, wherein the rings of said second series of hollow rings have an inner predetermined and an outer predetermined diameter.

* * * * *